Aug. 5, 1969  K. E. SUNDSTROM ET AL  3,459,479
AUTOMATIC GAIN BOOST FOR ANALYZERS
Filed Jan. 31, 1964
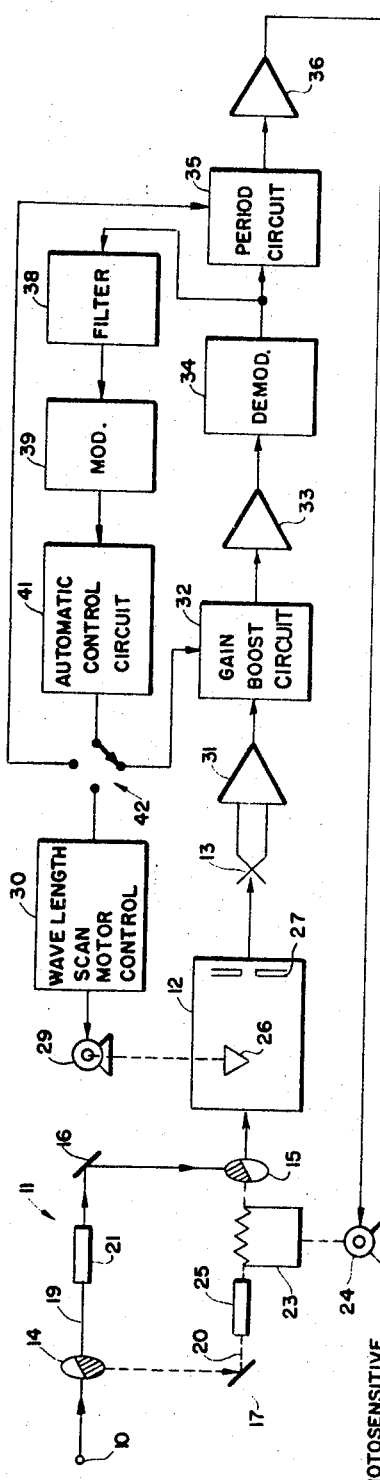
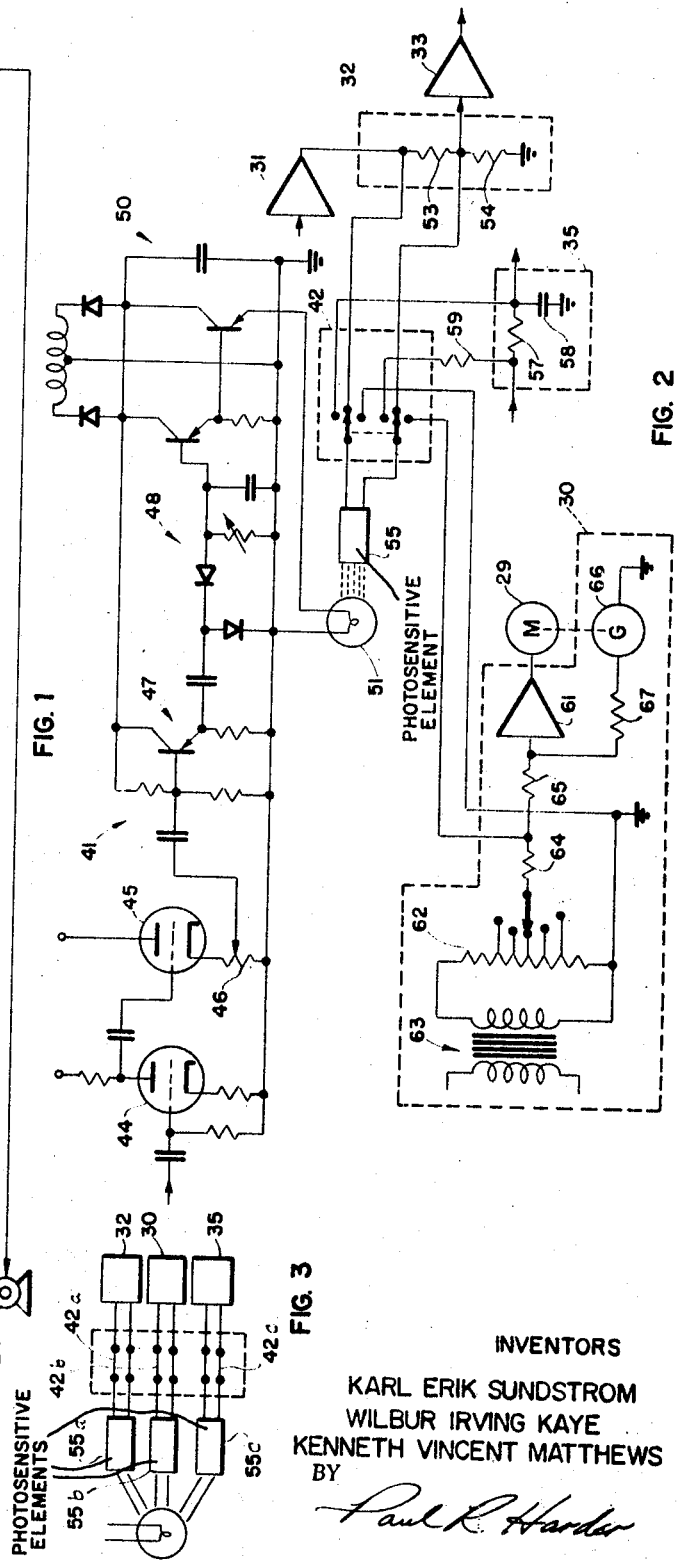
INVENTORS
KARL ERIK SUNDSTROM
WILBUR IRVING KAYE
KENNETH VINCENT MATTHEWS
BY
*Paul R. Harder*
ATTORNEY

United States Patent Office 3,459,479
Patented Aug. 5, 1969

3,459,479
AUTOMATIC GAIN BOOST FOR ANALYZERS
Karl Erik Sundstrom, Fullerton, Kenneth Vincent Matthews, Garden Grove, and Wilbur Irving Kaye, Fullerton, Calif., assignors to Beckman Instruments, Inc., a corporation of California
Filed Jan. 31, 1964, Ser. No. 341,607
Int. Cl. G01j 3/42, 1/36
U.S. Cl. 356—89                     11 Claims

ABSTRACT OF THE DISCLOSURE

The specification discloses an apparatus for reducing tracking errors in a double beam radiation analyzer of the optical null type. The apparatus comprises a gain boost circuit having a potential divider of two fixed resistors placed across the input of an amplifier in a comb servo loop. The input of the amplifier is taken across one of the fixed resistors while a variable resistor is placed in parallel with the other fixed resistor. The variable resistor is responsive to variations in intensity of the difference between the two beams, the variable resistor lowering in resistance as the intensity difference increases. The greater the intensity difference, the greater the input to the amplifier and, therefore the greater the gain of the comb loop. The variable resistor may also be switched into a period circuit of the comb servo loop or into a scan motor control, both of which may be operated selectively or in conjunction with the gain boost circuit.

---

This invention relates to radiation measuring systems such as spectrophotometers and more particularly to double beam radiation analyzers of the optical null type.

In this type of analyzer, radiation from a source is alternately switched along the sample and reference path and recombined at a detector which produces an electrical signal proportional to the radiant energy impinging thereon. The output of the detector is an alternating current signal having an amplitude and phase proportional to the difference and sense of the intensity in the reference and sample beams. This signal is applied to a servo loop which operates to position an attenuator or comb in the reference beam until an optical null is reached. The position of the attenuator or comb is a measure of sample transmittance which may be recorded. By use of a monochromator the entire spectrum of the sample may be continuously recorded.

Noise due to various causes is present in the system and it is usually desirable to eliminate or reduce the noise or its effects such that the noise in the record is minimized. Generally, this is accomplished by reducing the gain of the attenuator or comb servo loop to a point where the comb servo motor does not respond or is incapable of following the noise signal. This results in a reduced speed of response of the comb loop resulting in the inability of the comb to closely follow the signal generated by the detector due to sample absorption resulting in a loss of information in the record of the sample spectrum. The inability of the comb servo loop to follow this signal is generally termed tracking error.

Two methods of reducing the tracking error are disclosed in our copending application Tracking Accuracy Control for Analyzers, Ser. No. 116,641 filed May 22, 1961 now Patent No. 3,176,576. As disclosed in that application, the tracking error may be reduced by reducing the time constant of the period circuit in the servo loop during large detector signals or the scanning speed of the dispersing element may be reduced.

It is a general object of the present invention to provide a third method and means for reducing the tracking errors in an optical null type analyzer which may be utilized independently or in conjunction with the apparatus set forth in the aforementioned copending application.

It is a principle object of this invention to provide a double beam optical null radiation analyzer wherein the tracking errors are reduced without unduly increasing the system response to the noise signal.

A further object is to provide a system having a high gain in the presence of large detector signals and a lower gain in the presence of small detector signals.

A further object is to provide a double beam optical null radiation analyzer wherein the gain of the comb loop is automatically increased in the presence of large detector signals.

A still further object of this invention is to provide a double beam optical null radiation analyzer wherein the gain of the comb loop is continuously increased as a function of increasing detector signals.

Another object is to provide an optical null type analyzer wherein the tracking error may be reduced by selectively controlling the gain or the time constant in the period circuit of the comb servo loop, or the scanning speed of the wavelength scanning system.

Still another object is to provide an optical null radiation comparison system wherein reduced tracking error may be obtained by simultaneously controlling the gain of the comb servo loop, the time constant of the period circuit in the comb servo loop and the scanning speed of the system.

To accomplish the foregoing objects the invention generally contemplates the provision of a voltage divider across the input of an amplifier in the comb servo loop having a variable resistance which is reduced upon the occurrence of a large detector signal to increase the signal input to the amplifier. An automatic control circuit is provided which senses the amplitude of the detector signal to control the variable resistance.

There is also provided a variable impedance in the period circuit of the comb servo loop which may also be selectively or simultaneously controlled by the automatic control circuit. In the scan motor control a third variable impedance is provided which upon actuation by the automatic control circuit reduces the speed of the scan drive motor. This control likewise may be used selectively or in conjunction with the automatic gain and the period circuit controls.

Other objects and many of the attendant advantages of this invention and other novel combinations and arrangements of parts will become more apparent to those skilled in the art as the same becomes better understood by reference to the following detailed description when considered in connection with the accompanying drawing wherein like reference numerals refer to like parts throughout the several figures thereof and in which:

FIG. 1 is a block diagram of a double beam optical null spectrophotometer incorporating the tracking accuracy control of the invention;

FIG. 2 is a schematic diagram of a preferred embodiment of the tracking accuracy control; and FIG. 3 is a schematic diagram of an alternative circuit providing simultaneous gain, speed and period control.

The double beam optical null analyzer of FIG. 1 includes a radiation source 10, which may be any suitable source producing radiation over the desired spectrum to be analyzed, a beam switching system 11, monochromator 12 and a detector 13 such as, for example, a thermocouple. The beam switching system 11 includes half mirrors 14 and 15 and fixed mirrors 16 and 17. Half mirrors 14 and 15 are rotated in synchronism providing radiation alternately along sample beam path 19 and reference beam path 20. A sample cell 21 is positioned in the sample beam path for containing the sample to be analyzed. A reference beam attenuator or comb 23 is positioned in the reference beam path for varying the intensity of the radiation along the reference beam in response to the operation of motor 24. If desired, a reference cell 25 may also be positioned in the reference beam path.

Radiation from the reference and sample beam paths is directed by the beam switching system to the entrance slit of monochromator 12 which includes a dispersing element 26 such as, for example, a prism and an exit slit 27 which permits only a small band of the dispersed radiation to impinge upon detector 13. Dispersing element 26 is rotated by scan motor 29 in response to the output of the wavelength scan motor control 30 which ordinarily operates motor 29 at a constant rate of speed. If desired, a programmed change in scan speed over the spectrum may be accomplished by coupling the motor to the dispersing element by means of a cam of appropriate contour.

Detector 13 produces an electrical signal proportional to the difference in intensity of the radiation traversing the sample and reference paths. The detector signal cyclically varies at the beam switching rate, generally in the range of 5 to 20 c.p.s.

The signal generated by the detector is passed through amplifier 31 to gain boost circuit 32. The output of the gain boost circuit is further amplified by amplifier 33 and passed through demodulator 34 which produces a D.C. signal having an amplitude and sense proportional to the amplitude and phase of the A.C. signal produced by the detector. Demodulator 34 is operated in synchronism with the beam switching system and at the relatively low frequencies ordinarily encountered in such analyzers may preferably be of the mechanical chopper or switch type.

The output of demodulator 34 is passed by period circuit 35 and connected through amplifier 36 to control attenuator or comb motor 24. The output of the comb motor is a measure of the absorption at the sample cell and ordinarily may be connected to a recorder or other suitable output device for providing a permanent or visual indication of the absorption of the sample over the spectrum.

Period circuit 35 is preferably a low pass filter which limits the response area of the comb servo loop and reduces the responsivity of the loop to low level sharp transients in the detector signal generally produced by noise. The time constant of the period circuit is ordinarily selected as a compromise between the maximum response rate of the comb servo and an acceptable noise level. Typically, the time constant is in the range of 1 to 32 seconds.

It is desirable in the operation of spectrophotometers to perform an analysis of the sample in the shortest possible time. This requires that the scan motor run at the highest possible speed and the comb servo response be high as possible. However, because of the presence of noise and the undesired response of the comb servo to the noise signal, the period circuit, which reduces the responsivity of the loop, is generally required. When large detector signals created by sharp, high absorption bands in the sample are generated, the comb servo lags behind the scan system resulting in the loss of desired information about the sample spectrum and loss of tracking accuracy.

As disclosed in our aforementioned copending application one method of improving the tracking accuracy is to reduce or suppress the scan motor speed during the existence of these large detector signals so that the comb servo with its limited response rate can more accurately follow the detector signal. The tracking accuracy may also be improved by reducing the time constant of the period circuits during large detector signals thereby increasing the response rate of the comb servo loop permitting more rapid and accurate operation of the nulling system. It has further been found that the tracking accuracy may be improved by increasing the gain of the comb loop during the occurrence of large detector signals.

The analyzer illustrated in FIG. 1 illustrates a system wherein each of these controls may be selectively utilized. The signal from demodulator 34 is passed through filter 38 to modulator 39. Modulator 39 may be operated at any desired frequency, conveniently 60 cycles, and provides at the input of automatic control circuit 41 an A.C. signal having an amplitude proportional to the amplitude of the D.C. output of demodulator 34. The output of automatic control circuit 41 may be selectively connected to wavelength scan motor control 30, gain boost control 32 or period circuit 35 via switch 42. Automatic control circuit 41 senses the amplitude of the detector signal and provides a control to increase gain of the loop, reduce the time constant of the period circuit or decrease the scan speed of the wavelength scan motor depending upon the position of switch 42.

Referring now to FIG. 2 there is illustrated in greater detail a preferred embodiment of the control circuit 41 and of the gain boost control 32, the period circuit 35 and wavelength scan motor control 30.

The A.C. output of modulator 39 is coupled to the input stage of an amplifier comprising triode 44 having its output connected to triode 45 connected as a cathode follower. Potentiometer 46 utilized as the cathode resistance of the cathode follower provides a gain control for the circuit. Potentiometer 46 is connected to a transistor amplifier stage 47 the output of which is rectified in a diode rectifier and filter stage 48. The output of the rectifier filter stage drives a two stage transistor current amplifier 50 having lamp 51 connected across its output.

The gain boost circuit 32 comprises a potential divider connected across the output of amplifier 31 and includes fixed resistors 53 and 54, the input of amplifier 33 being taken from across resistor 54. Photosensitive element 55 may be selectively connected across fixed resistor 53 by switch 42 and operates with resistor 53 to form a variable impedance. Element 55 is positioned such that radiation emitted by lamp 51 impinges thereon. The photosensitive element is preferably selected such that in the absence of radiation from lamp 51 the resistance thereof is quite high and its effect on the potential divider may be made negligible. As the intensity of radiation emitted from lamp 51 gradually increases the resistance of photosensitive element 55 decreases and results in a decrease in the total resistance connected across the output of amplifier 31. This action increases the amplitude of the signal appearing across resistor 54 thus increasing the input to amplifier 33.

By adjusting gain potentiometer 46 in automatic control circuit 41 the amplitude of the input signal required to reach the threshold level of lamp 51 may be varied. It is apparent that as the detector signal increases, the intensity of the radiation emitted by lamp 51 increases and the resistance of photosensitive element 55 decreases. This increases the proportionate amount of the output of amplifier 31 that is applied across the input of amplifier 33 thus continuously increasing the gain of the servo loop as a function of the amplitude of the detector signal.

The period circuit may conveniently comprise a resistance-capacitance low pass filter section including series resistor 57 and shunt capacitor 58. By operation of switch 42 photosensitive element 55, in series with resistor 59, may be connected in parallel across resistor 57. When the detector signal is small lamp 51 is dark and the resistance of element 55 is large compared to resistor 57 and therefore has little effect on the time constant of the circuit. However, as the intensity of lamp 51 increases with an increasing detector signal the resistance of element 55 decreases thus continuously reducing the time constant of period circuit 35 as a function of the error signal amplitude and increasing the rate of response of the comb servo loop.

Again, by selective operation of switch 42, photosensitive element 55 may be included as a variable impedance in wavelength scan motor control 30. Scan motor 29 has its input connected to the output of amplifier 61. The input to amplifier 61 is taken from tapped resistor 62 through series resistors 64 and 65. Resistor 62 is connected across the secondary winding of transformer 63 and the motor speed is set by selecting the particular tap along resistor 62. The motor speed is stabilized by a feedback through resistor 67 from generator 66 mechanically coupled to motor 29.

Switch 42 can selectively connect photosensitive element 55 between the junction of resistors 64 and 65 and a point of common potential, generally circuit ground. When the resistance of element 55 is large this element has little effect on the operation of scan motor control 30. However, as the resistance of the element decreases with the increasing intensity of lamp 51, resistor 64 and photosensitive element 55 function as a voltage divider to reduce the input signal to amplifier 61 thus decreasing the speed of motor 29.

The alternative embodiment of the automatic control circuit 41 illustrated in FIG. 3 permits selective or simultaneous use of each of the tracking accuracy controls. In this embodiment three photosensitive elements 55a, 55b, and 55c are substituted for the single photosensitive element 55 of the embodiment of FIG. 2. Switch 42 may be replaced by three separate switches 42a, 42b and 42c. Closure of switch 42a connects photosensitive element 55a to gain boost control 32. Switches 42b and 42c respectively connect photosenstive elements 55b and 55c to wavelength scan motor control 30 and period circuit 35. It is apparent that by simultaneously closing each of the switches all three circuits may be simultaneously operated or by selectively closing one or more switches each of the circuits may be utilized individually or employed in various combinations. It is obvious that the switches may comprise a single multiple position switch provided with the desired connection combinations.

Lamp 51 is preferably an incandescent lamp wherein the radiation intensity is a function of the driving current. Lamps with various intensity-current characteristics can be selected to vary the relation between the detector signal and the degree of the desired control. Photosensitive element 55 may preferably be a photo diode having a conductance that is a continuous function of the impinging radiation. The photosensitive elements of various illumination-resistance characteristics may also be selected to vary the relation between the detector signal and the degree of the desired control.

There has been illustrated and described a tracking accuracy control which provides speed suppression, period suppression and automatic gain boost selectively or in combination during the operation of double beam optical null type radiation analyzers. It is apparent that by utilizing the lamp and radiation sensitive elements in the auxiliary control circuit isolation from conventional circuitry of the invention is achieved and creates no undesirable loading effects on the remainder of the system. It is further apparent that other embodiments, various changes, modifications and substitutions may be made from the embodiments illustrated.

What is claimed is:

1. In a double beam optical null radiation analyzer having servo loop means for varying the intensity of one of the beams as a function of an error signal to balance radiation in the beams, said loop means including a radiation detector generating an electrical signal varying as a function of the radiation intensity impinging thereon, the improvement comprising:

gain boost means connected in said servo loop means for controlling the gain of said servo loop means and reducing the effect of noise in the electrical signal on the servo position;

gain boost control means for controlling said gain boost means; and means for energizing said gain boost control means as a function of the electrical signal generated by the detector for increasing the gain of said servo loop means as said electrical signal increases thereby increasing the sensitivity of the servo loop means to said electrical signal.

2. In a double beam optical null radiation analyzer having a servo loop means for varying the intensity of one of the beams as a function of an error signal to balance the beams, said servo loop means including a radiation detector generating an electrical signal varying as a function of the intensity of the beams impinging on said detector, the improvement comprising:

gain boost means connected in said servo loop means for controlling the gain of the servo loop and reducing the effect of noise in the error signal on the servo position;

gain boost control means including a radiation sensitive element connected in said gain boost means and a radiation producing means positioned for radiating said radiation sensitive element; and means for energizing said radiation producing means as a function of the electrical signal generated by said detector, the impedance of said radiation sensitive element decreasing as the intensity of the radiation impinging thereon increases for increasing the gain in said servo loop means and decreasing the response time of the servo loop means.

3. In a double beam optical null radiation analyzer having servo loop means for varying the intensity of one of the beams as a function of an error signal to balance the radiation in said beams, said servo loop means including radiation detector means generating an electrical signal varying as a function of the intensity difference in the beams arriving at the detector and at least one amplifier means for amplifying said electrical signal, the improvement comprising:

a potential divider connected across the input of said amplifier means, said potential divider including a variable impedance means for controlling the amplitude of the input to said amplifier; and means coupled to said variable impedance means for varying the impedance of said variable impedance means as a function of the intensity difference between the beams for increasing the gain of the servo loop means thereby increasing the sensitivity of said servo loop means to increasing intensity difference in said beams.

4. In a double beam optical null radiation analyzer having a servo loop means for varying the intensity of one of the beams as a function of an error signal to balance the beams, said servo loop means including a radiation detector for generating an electrical signal varying as a function of the intensity difference of the beams impinging on said detector, the improvement comprising:

a potential divider including at least a pair of resistors connected in electrical series circuit;

radiation producing means;

radiation sensitive means positioned for radiation by said radiation producing means and connected in parallel with one of said pair of resistors for varying the output of said potential divider, said radiation sensitive means having a conductance that varies as function of the radiation produced by said radiation producing means; and means connected to said servo loop means and to said radiation producing means for energizing said radiation producing means as a function of the intensity difference of the beams for increasing the gain of said servo loop means as a function of intensity difference.

5. A radiation analyzer having a light source, reference and sample beam paths, a monochromator and a wavelength scanning mechanism therefor, servo loop means for varying the intensity in one of said beam paths to balance the radiation in said paths, said servo loop means including a radiation detector producing an electrical error signal varying as a function of the radiation impinging upon said detector, the improvement comprising:

a drive motor in said wavelength scanning mechanism for continuously varying the wavelength of said monochromator output;

a control circuit connected to said drive motor for operating said motor at a predetermined speed;

a period circuit connected in said servo loop means and including means having a time constant thereby controlling the response time of the servo;

gain control means connected in said servo loop means for controlling the gain in said loop;

radiation producing means;

control means connected to said servo loop means and to said radiation producing means for energizing said radiation producing means as a function of the intensity difference in said beam paths;

radiation sensitive means positioned for radiation by said radiation producing means, said radiation sensitive means having an impedance varying as a function of the radiation impinging thereon; and switch means for selectively connecting said radiation sensitive means in circuit with said control circuit, said period circuit, and said gain control means for changing the motor speed, the period circuit time constant and the gain in said servo loop means, respectively, as a function of the intensity difference in said beam paths.

6. In a radiation analyzer having a radiation source, reference and sample beam paths, a monochromator and a wavelength scanning mechanism therefor, servo loop means for varying the intensity of the beam along one of said paths, said servo loop means including at least a radiation detector producing an electrical signal varying as a function of the intensity of the radiation impinging thereon and a period circuit having a time constant thereby controlling the response time of said servo loop means, the improvement comprising:

gain control means connected in said servo loop means for controlling the gain of said servo loop;

variable impedance means;

switch means for connecting at least a portion of said variable impedance means in said period circuit and to said gain control means for varying the time constant of said period circuit and the gain of said servo loop means each as a function of the impedance of said variable impedance means; and a control circuit coupled to said servo loop means and to said variable impedance means for varying the impedance of said variable impedance means as a function of the intensity difference of the radiation in said beam paths.

7. A radiation analyzer having a radiation source, reference and sample beam paths, a monochromator and a wavelength scanning mechanism therefor, servo loop means for varying the intensity of the beam along one of said paths, said servo loop means including a radiation detector producing an electrical signal varying as a function of the intensity of the radiation impinging thereon, the improvement comprising:

a drive motor in said wavelength scanning mechanism for continuously varying the wavelength of said monochromator output;

a control circuit connected to said drive motor for operating said motor at a predetermined speed;

a period circuit connected in said servo loop means and including means having a time constant thereby controlling the response time of said servo loop means;

gain control means connected in said servo loop means for controlling the gain in said loop;

variable impedance means;

switch means for selectively or simultaneously connecting at least a portion of said variable impedance means in said control circuit, said period circuit and said gain control means for controlling the speed of said motor, the time constant of said period circuit and the gain of said servo loop means as a function of the impedance of said variable impedance means; and control means connected to said servo loop means and to said variable impedance means for controlling the impedance of said variable impedance means as a function of the intensity difference in said beam paths.

8. In a radiation analyzer having a radiation source, a beam switching system producing reference and sample beam paths, a monochromator and a wavelength scanning mechanism therefor, servo loop means for varying the intensity of the beam along one of said beam paths, said servo loop means including a radiation detector producing an electrical signal output as a function of the intensity of radiation impinging thereon and a demodulator operated in synchronism with said beam switching system, the improvement comprising:

a period circuit connected in said servo loop means, said period circuit including a low pass filter section having a serially connected resistor for limiting the response time of said servo loop means;

a drive motor in said wavelength scanning mechanism for continuously varying the wavelength of said monochromator output;

a control circuit connected to said drive motor for operating said motor at a predetermined speed and including a voltage divider circuit for setting said speed;

gain control means connected in said servo loop means and including a voltage divider circuit for setting the gain of said servo loop means;

radiation producing means;

control means connected to said servo loop means and to said radiation producing means for energizing said radiation producing means as a function of the intensity difference in said beam paths;

radiation sensitive means positioned for radiation by said radiation producing means, said radiation sensitive means having an impedance varying as a function of the radiation imginging thereon; and switch means for connecting at least a portion of said radiation sensitive means in shunt with said resistor in said period circuit, into said voltage divider in said control circuit connected to said drive motor and in shunt with at least one of said resistors in said gain control means for changing the time constant of said period circuit, the motor speed, and the gain of said servo loop means, respectively, as a function of the intensity difference in said beam paths.

9. In a radiation analyzer having a radiation source, reference and sample beam paths, a monochromator and a wavelength scanning mechanism therefor, a drive motor in said wavelength scanning mechanism for varying the wavelength of said monochromator output, a control circuit connected to said drive motor for controlling the speed of said motor, servo loop means for varying the intensity of the beam along one of said paths, said servo loop means including at least a radiation detector producing an electrical signal varying as a function of the intensity of the radiation impinging thereon, the improvement comprising:

gain control means conected in said servo loop means for controlling the gain of said servo loop;

variable impedance means;

switch means for connecting at least a portion of said variable impedance means in said control circuit for said motor and to said gain control means for varying the speed of said motor and the gain of said servo loop means each as a function of the impedance of said variable impedance means; and a control circuit coupled to said servo loop means and to said variable impedance means for varying the impedance of said variable impedance means as a function of the intensity difference of the radiation in said beam paths.

10. A double beam optical null radiation analyzer having servo loop means for varying the intensity of one of the beams to balance the radiation in said beams, said servo loop means including radiation detector means generating an electrical signal varying as a function of the intensity impinging on said detector, the improvement comprising:

a potential divider coupled across the output of said detector including at least first and second serially connected impedance means;

an amplifier connected in said servo loop means;

means connecting said second impedance means across the input of said amplifier;

a lamp;

amplifier means coupled to said servo loop means for energizing said lamp as a function of the intensity difference in said beams; and a photosensitive element connected in parallel with said first impedance means, said photosensitive element positioned for radiation by said lamp and having a resistance varying as a function of the light impinging thereon for varying the impedance of said potential divider and thereby the input to said amplifier as a function of the intensity difference in said beams.

11. In a radiation analyzer having a radiation source, a beam switching system producing reference and sample beam paths, a monochromator and a wavelength scanning mechanism therefor, servo loop means for varying the intensity of the beam along one of said beam paths, said servo loop means including a radiation detector producing an electrical signal output as a function of the intensity of radiation impinging thereon, said loop means further including amplifier means for amplifying the electrical signal output of said detector and a demodulator operated in synchronism with said beam switching system for producing a D.C. signal having an amplitude proportional to the intensity difference in the radiation along said reference and sample beam paths, the improvement comprising:

a potential divider including first and second serially connected resistors coupled across the output of said radiation detector;

means connecting said second resistor across the input of said amplifier;

a lamp;

amplifier means coupled to the output of said demodulator for energizing said lamp as a function of the output of said demodulator, said amplifier means including gain control means for adjusting the threshold level of said lamp;

a photosensitive resistor connected across said first resistor, said photosensitive resistor positioned for radiation by said lamp and having a resistance varying as a function of the light impinging thereon for varying the gain of said servo loop means as a function of the intensity difference in the radiation in said reference and sample beam paths.

References Cited

UNITED STATES PATENTS 3,176,576   4/1965   Sundstrom et al. _____ 356—89

RONALD L. WIBERT, Primary Examiner

F. L. EVANS, Assistant Examiner

U.S. Cl. X.R.

250—204; 356—95, 97

PO-1050
(5/69)

UNITED STATES PATENT OFFICE
CERTIFICATE OF CORRECTION

Patent No. 3,459,479           Dated   August 5, 1969

Inventor(s) Karl Erik Sundstrom, Kenneth Vincent Matthews and
            Wilbur Irving Kaye It is certified that error appears in the above-identified patent and that said Letters Patent are hereby corrected as shown below:

Column 6, line 67, after "as" insert --a--;  Column 6, line 74, after "of" insert --said--.

SIGNED AND
SEALED
APR 14 1970

(SEAL)
Attest:

Edward M. Fletcher, Jr.
Attesting Officer

WILLIAM E. SCHUYLER, JR.
Commissioner of Patents